(12) United States Patent
Fulleringer et al.

(10) Patent No.: US 12,442,416 B2
(45) Date of Patent: Oct. 14, 2025

(54) THREE-POINT CONTACT ROLLING BEARING WITH IMPROVED DRAIN

(71) Applicant: SAFRAN HELICOPTER ENGINES, Bordes (FR)

(72) Inventors: Benjamin Nicolas Fulleringer, Moissy-Cramayel (FR); Damien Paul Antonin Lecouvreur, Moissy-Cramayel (FR); Laurent Jean Crabos, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 140 days.

(21) Appl. No.: 17/757,416

(22) PCT Filed: Dec. 15, 2020

(86) PCT No.: PCT/FR2020/052435
§ 371 (c)(1),
(2) Date: Jun. 15, 2022

(87) PCT Pub. No.: WO2021/123596
PCT Pub. Date: Jun. 24, 2021

(65) Prior Publication Data
US 2023/0008954 A1 Jan. 12, 2023

(30) Foreign Application Priority Data
Dec. 16, 2019 (FR) ...................................... 1914482

(51) Int. Cl.
*F16C 33/66* (2006.01)
*F16C 19/16* (2006.01)

(52) U.S. Cl.
CPC ........ *F16C 33/6685* (2013.01); *F16C 19/163* (2013.01); *F16C 2326/43* (2013.01)

(58) Field of Classification Search
CPC ........ F16C 19/14; F16C 19/16; F16C 19/163; F16C 19/166; F16C 33/6685;
(Continued)

(56) References Cited

U.S. PATENT DOCUMENTS 3,666,598 A  5/1972  Christie et al.
6,116,786 A  9/2000  Takata et al.
(Continued)

FOREIGN PATENT DOCUMENTS

BE  769961 A  11/1971
CN  2573751 Y  9/2003
(Continued)

OTHER PUBLICATIONS

Machine Translation of DE-102006012001-A1 (Year: 2007).*
(Continued)

*Primary Examiner* — Alan B Waits
(74) *Attorney, Agent, or Firm* — Bookoff McAndrews, PLLC

(57) ABSTRACT

Rolling bearing with three contact points, wherein the inner raceway, the third contact point being located in a sector of the outer raceway delimited by a proximal end of the outer raceway on the one hand, and by the rolling plane on the other hand, characterized in that the outer ring comprises a drain provided in the outer raceway, and opening from an outer surface of the outer ring, said drain opening eccentrically on the outer raceway with respect to the rolling plane, in a sector of the outer raceway delimited by the rolling plane on the one hand, and a distal end of the outer raceway on the other hand, the drain and the third contact point being disjoint.

9 Claims, 4 Drawing Sheets

(58) Field of Classification Search
CPC .............. F16C 33/6681; F16C 2326/43; F16C 2360/23; F05D 2240/50; F01D 25/16–22
See application file for complete search history.

(56) References Cited

U.S. PATENT DOCUMENTS

| | | | |
|---|---|---|---|
| 7,097,362 | B2 | 8/2006 | Inukai et al. |
| 2004/0066997 | A1 | 4/2004 | Inukai et al. |
| 2006/0025257 | A1 | 2/2006 | Tanabe et al. |
| 2006/0159378 | A1 | 7/2006 | Plona et al. |
| 2008/0267548 | A1 | 10/2008 | Chriss |
| 2012/0189235 | A1* | 7/2012 | McNeil ............... F16C 33/6685 384/475 |
| 2013/0336608 | A1* | 12/2013 | Miller ................. F16C 33/585 384/492 |
| 2017/0009603 | A1* | 1/2017 | Carter .................... F01D 5/027 |
| 2017/0211628 | A1 | 7/2017 | Ishii et al. |
| 2019/0170187 | A1 | 6/2019 | Matsunaga et al. |
| 2020/0096045 | A1* | 3/2020 | Duffy ................. F16C 33/6659 |

FOREIGN PATENT DOCUMENTS

| | | | | |
|---|---|---|---|---|
| CN | 103737024 | A | | 4/2014 |
| CN | 109642613 | A | | 4/2019 |
| CN | 208749811 | U | | 4/2019 |
| CN | 110008555 | A | | 7/2019 |
| CN | 217328176 | U | | 8/2022 |
| CN | 116336083 | A | | 6/2023 |
| DE | 102006012001 | A1 * | 9/2007 | ............. F16C 19/54 |
| DE | 102010027011 | A1 | | 1/2012 |
| DE | 102015220016 | A1 | | 4/2017 |
| EP | 0769631 | A1 | | 4/1997 |
| EP | 1898072 | A1 | | 3/2008 |
| FR | 3056656 | A1 | | 3/2018 |
| JP | H1113750 | A * | 1/1999 | |
| JP | 2000192971 | A | | 7/2000 |
| JP | 2003139146 | A | | 5/2003 |
| JP | 2006105323 | A * | 4/2006 | ............. F16C 33/32 |
| JP | 2007024105 | A | | 2/2007 |
| JP | 2008008458 | A | | 1/2008 |
| JP | 2009185979 | A | | 8/2009 |
| JP | 2009275722 | A | | 11/2009 |
| JP | 2010133548 | A * | 6/2010 | |
| JP | 2018141479 | A * | 9/2018 | ............. F16C 19/163 |
| KR | 20180099441 | A | | 9/2018 |
| WO | 9100436 | A1 | | 1/1991 |
| WO | 2007007789 | A1 | | 1/2007 |
| WO | 2014119631 | A1 | | 8/2014 |
| WO | 2018058814 | A1 | | 4/2018 |
| WO | 2018174086 | A1 | | 9/2018 |

OTHER PUBLICATIONS

Machine Translation of JP-H1113750-A (Year: 1999).*
Machine Translation of JP-2006105323-A (Year: 2006).*
Machine Translation of JP-2010133548-A (Year: 2010).*
Machine Translation of JP-2018141479-A (Year: 2018).*
French Search Report issued in French Application FR 1914482 on Aug. 27, 2020 (7 pages).
International Search Report issued in International Application PCT/FR2020/052435 on May 7, 2021 (3 pages).
First Office Action issued in corresponding Chinese Application No. 2024041801452290, issued Apr. 18, 2024.

* cited by examiner

[Fig. 1]
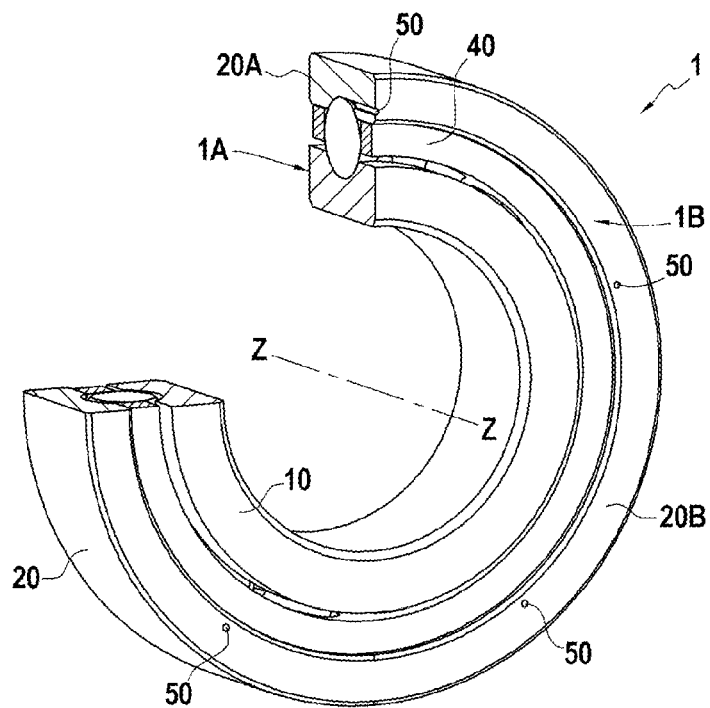
[Fig. 2]
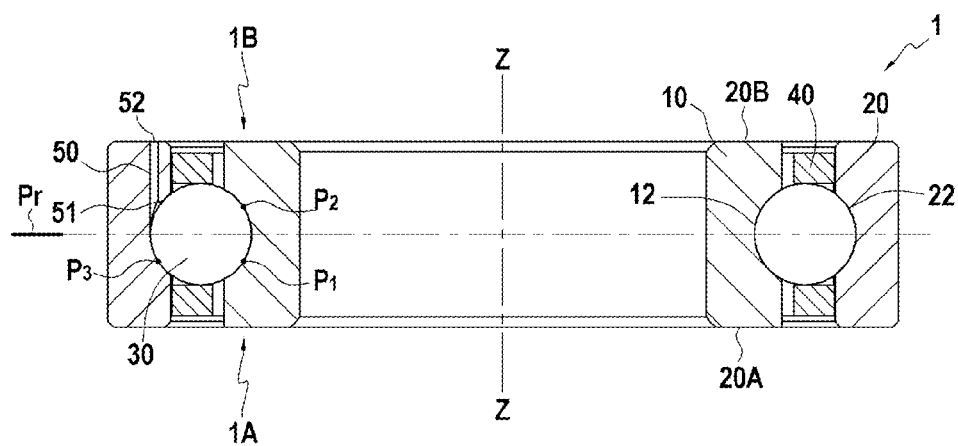

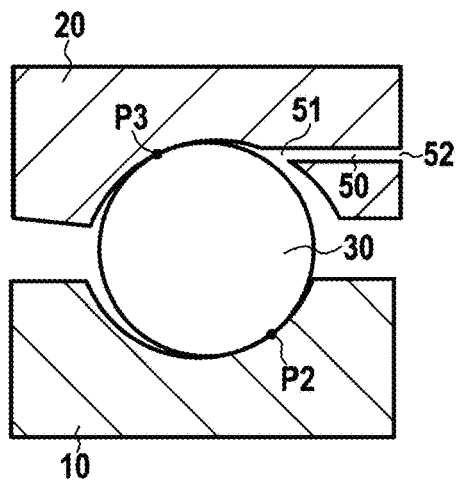
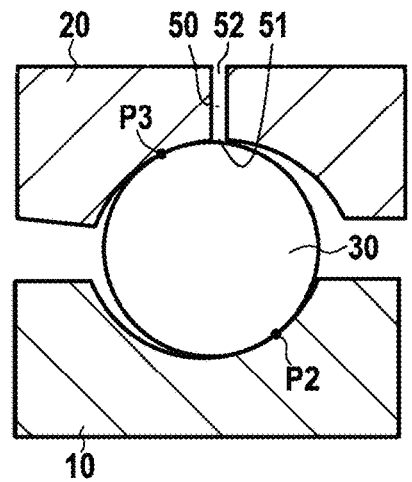
FIG.3A  FIG.3B
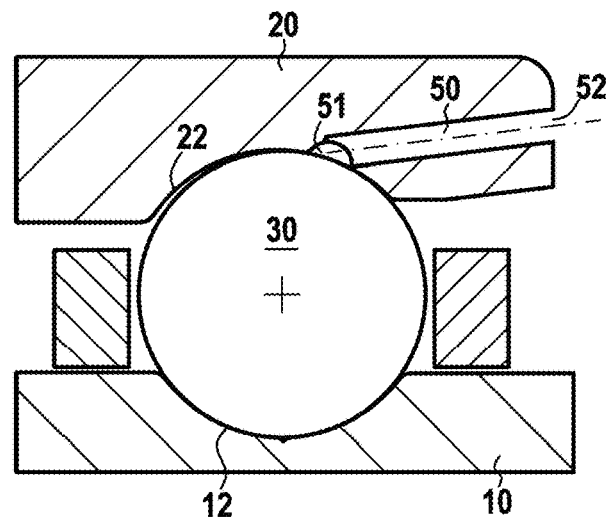
FIG.4
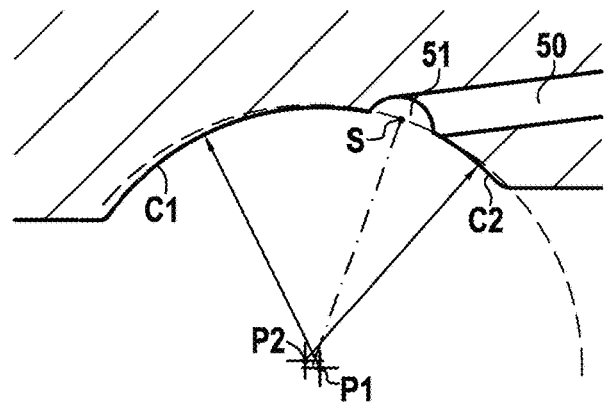
FIG.5

[Fig. 6]
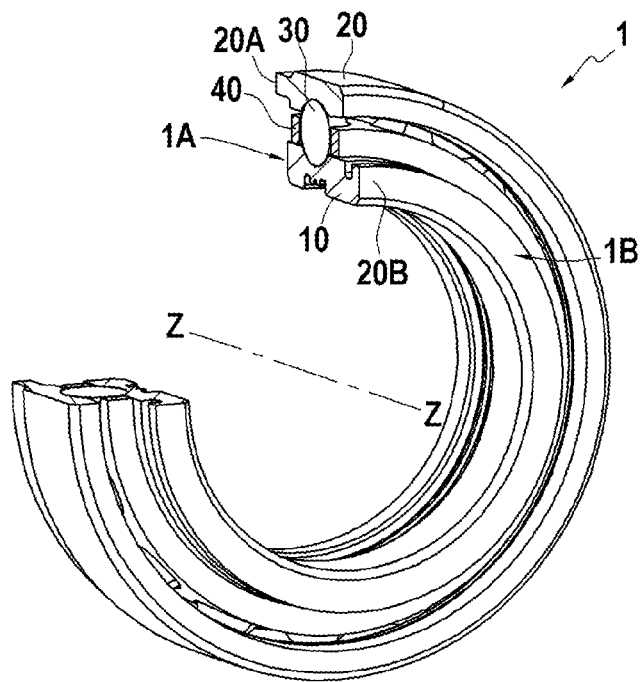
[Fig. 7]
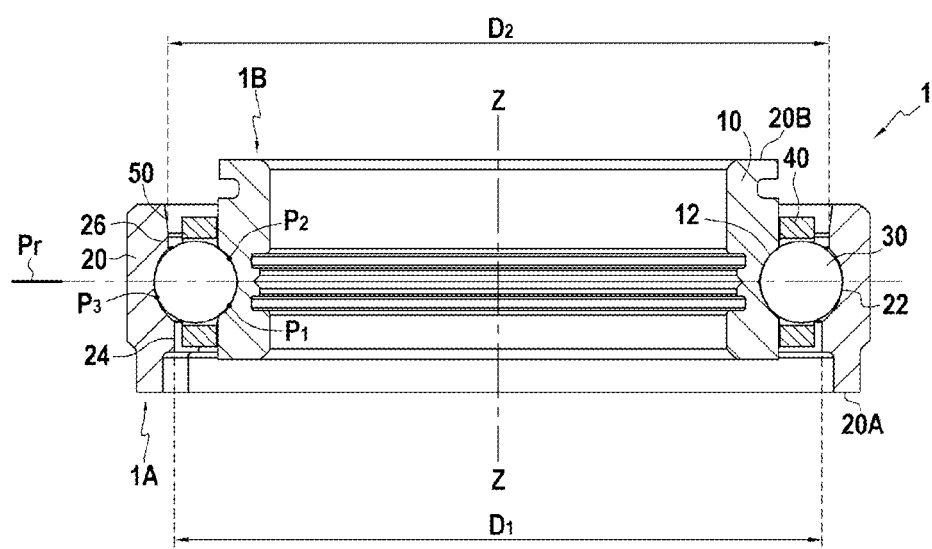

[Fig. 8]
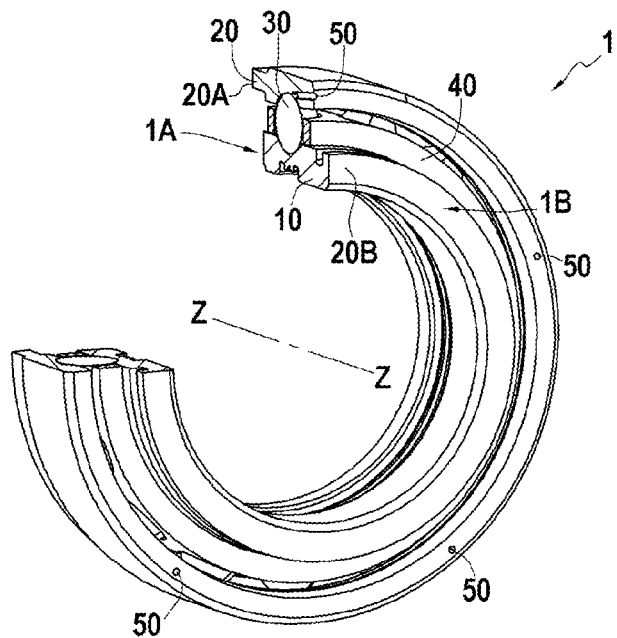
[Fig. 9]
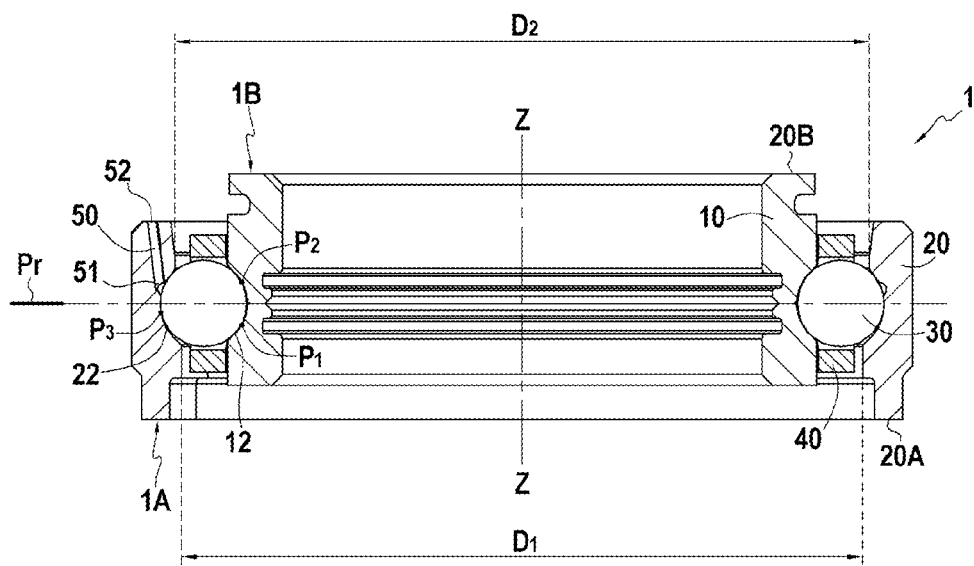

THREE-POINT CONTACT ROLLING BEARING WITH IMPROVED DRAIN

CROSS-REFERENCE TO RELATED APPLICATIONS

This patent application is the U.S. National Stage entry under 35 U.S.C. § 371 of International Patent Application No. PCT/FR2020/052435, filed on Dec. 15, 2020, which claims the benefit of priority to French Patent Application No. 1914482, filed on Dec. 16, 2019.

TECHNICAL FIELD

The present disclosure relates to rolling bearing used in particular in turbine engines and electric motors employed in the field of aeronautics.

PRIOR ART

Rolling bearings employed in turbine engines are employed at high speeds. It is thus necessary to ensure in them a circulation of a fluid, typically oil or fuel, in order to ensure the lubrication and the cooling of the rolling bearings. Known solutions propose to carry out drilling in a radial plane relative to the axis of the rolling bearing in order to ensure a circulation of fluid.

However, these solutions do not provide sufficient total gain. In fact, the drilling centered on the radial plane involves making a rolling bearing with four contact points in order to ensure that the rolling elements do not come into contact with the drilling. Yet a structure of this type can lead to operation with two contact points on the outer ring, in particular in the case of operation during which the rolling elements are subjected to axial forces combined with substantial radial forces. This is the case particularly at high speeds, with large radial centrifugal forces. Operation of this type with two contact points on the outer ring generates a sliding of each rolling element at the second contact point appearing on the outer ring, which causes a large dissipation of power which nullifies the gain obtained by the circulation of oil. The net effect in terms of power for current systems is therefore near zero at high speed.

DISCLOSURE OF THE INVENTION

The present disclosure thus seeks to respond at least partially to this problem.

To this end, the present disclosure relates to a three-point contact rolling bearing, comprising an inner ring and an outer ring defining respectively an inner raceway and an outer raceway between which are disposed a plurality of spherical rolling elements, so as to define a rotation movement along a main axis between the inner ring and the outer ring, said rolling elements being centered on a rolling plane perpendicular to the main axis, in which the inner raceway defines a first contact point and a second distinct contact point between each rolling element and the inner ring, the outer ring defines a third contact point between each rolling element and the outer ring, said third contact point being located in a sector of the outer raceway delimited by a proximal end of the outer raceway on the one hand, and by the rolling plane on the other hand, the outer ring comprises a drain provided in the outer raceway and opening from an outer surface of the outer ring, said drain opening eccentrically on the outer raceway with respect to the rolling plane, in a sector of the outer raceway delimited by the rolling plane on the one hand, and a distal end of the outer raceway on the other hand, the drain and the third contact point being disjoint, characterized in that the drain is formed by a continuous bore extending from the outer raceway until a distal end of the outer ring.

According to one example, the drain extends in a direction having a non-zero radial component and a non-zero axial component with respect to the main axis, and typically a non-zero circumferential component. According to another variant, the drain extends in a direction parallel to the main axis.

According to one example, the drain opens from an outer surface of the outer ring extending radially with respect to the main axis.

According to one example, the drain extends in a radial direction with respect to the main axis.

According to one example, the outer ring has a proximal end and a distal end, the third contact point being in an area delimited axially by the proximal end and by the rolling plane, and in which the outer ring forms a proximal shoulder and a distal shoulder on either side of the rolling plane along the main axis, said shoulders having distinct dimensions in a radial direction with respect to the main axis.

The proximal shoulder then typically has a greater thickness than the distal shoulder, the thickness being measured in a radial direction with respect to the main axis.

According to one example, the outer ring comprises a plurality of disjoint drains distributed around the main axis.

According to one example, the outer raceway has an ogive shape, formed by two circular arcs having distinct centers and which intersect at a point forming a peak of said ogive, and in which the drain opens on the outer raceway at said peak.

The present disclosure also relates to a turbine engine comprising at least one rolling bearing according to one of the preceding claims.

The present disclosure also relates to an aircraft comprising a turbine engine of this type.

BRIEF DESCRIPTION OF THE DRAWINGS

The invention and its advantages will be better understood upon reading the detailed description given hereafter of different embodiments of the invention given by way of non-limiting examples.

FIG. 1 shows a partial perspective view of a rolling bearing according to one embodiment.

FIG. 2 is a section view of the rolling bearing shown in FIG. 1.

FIGS. 3A and 3B illustrates schematically an operating mode of the rolling bearing.

FIG. 4 is a schematic view illustrating an example of a structure of the outer ring.

FIG. 5 is a schematic view illustrating an example of a structure of the outer ring.

FIG. 6 shows a partial perspective view of a rolling bearing according to another exemplary embodiment.

FIG. 7 is a section view of the rolling bearing shown in FIG. 5.

FIG. 8 shows a partial perspective view of a rolling bearing according to another exemplary embodiment.

FIG. 9 is a section view of the rolling bearing shown in FIG. 7.

In all the figures, common elements are labeled with identical numerical references.

DESCRIPTION OF THE EMBODIMENTS

FIGS. 1 and 2 shows a first example of a rolling bearing 1 according to one aspect of the invention. FIG. 1 is a perspective view with a quarter of the rolling bearing 1 truncated, and FIG. 2 is a section view in a plane passing through the main axis Z-Z. The rolling bearing 1 as shown in FIGS. 1 and 2 has an inner ring 10 and an outer ring 20 between which are disposed a plurality of rolling elements 30, here spherical rolling elements or balls.

The rolling elements 30 are here partially surrounded by an optional cage 40, which improves the axial retention of the rolling elements 30.

Defined arbitrarily is a proximal end 1A and a distal end 1B for the rolling bearing 1, these designations not being limiting and having only an illustrative purpose. It is possible subsequently to refer to a proximal or distal end of the different elements, these designations being indicated with respect to the proximal end 1A and to the distal end 1B of the rolling bearing 1, and being labeled with numerical references to which are respectively added the letters A and B.

The rolling bearing 1 defines a relative rotation movement between the inner ring 10 and the outer ring 20 along an axis of rotation that is called the main axis Z-Z. Defined with respect to this main axis is a radial direction X-X, extending radially with respect to the main axis Z-Z.

The rolling elements 30 are centered on a rolling plane Pr which extends radially with respect to the main axis Z-Z. What is meant by centered is that the centers of the different rolling elements 30 are disposed in the rolling plane Pr, typically within manufacturing tolerances. Because by definition the rolling plane passes through the centers of the rolling elements 30, its position in a fixed reference frame can vary somewhat in the direction of the main axis Z-Z, due to the fact that the rolling elements 30 can be brought to move somewhat in this same direction with respect to the inner ring 10 and/or the outer ring 20, in particular during a modification of the intensity or the direction of the axial load applied to the rolling bearing.

For the rolling bearings, reference is commonly made to the speed factor generally designated by NDm, which is the product of the speed of rotation of the rolling bearing N in revolutions per minute and the average diameter Dm (or pitch diameter) of the rolling bearing in millimeters. The speed factor thus translates both the speed of rotation of the rolling bearing and its dimensions. It is understood in fact that the greater a dimension of the rolling bearing 1, the higher the speed factor will be for the same rotation speed.

The rolling bearings as presented in the different embodiments commonly have a speed factor greater than 1,000,000 NDm, or typically greater than 1,200,000 NDm, or even greater than 1,500,000 NDm. The rolling bearings typically have an average diameter Dm greater than or equal to 50 mm, and a rotation speed greater than 20,000 revolutions per minute. For such speed factors, it is understood that it is necessary to ensure the lubrication and cooling function of the rolling bearings.

The rolling bearing 1 is a three-point contact rolling bearing. Under normal operating conditions of the rolling bearing 1, three contact points are thus defined for each rolling element 30 distributed between the inner ring 10 and the outer ring 20. The rolling bearings 1 as considered are designed to function with a predetermined axis direction of the load, corresponding to the nominal operation of a rotor such as a shaft of a turbine engine shaft or more generally of a turbomachine. However, load reversals can occur, thus causing an inversion of the direction of application of the axial load. Here reference will generally be made to nominal operation, i.e. with an axial load in a given direction.

The inner ring 10 has an inner raceway 12 in contact with which are disposed the rolling elements 30. The inner raceway 12 typically has the shape of an ogive, or more generally a shape with two portions, typically symmetrical or asymmetrical with respect to the rolling plane Pr, defining two distinct contact points with each rolling element 30 on either side of the rolling plane Pr. It is understood that in practice, the contacts between the rolling elements 30 and the inner 10 and outer 20 rings are not necessarily by point, but can be by surface due to deformation of the material. The present disclosure retains the theoretical model of point contact.

Thus defined is a first contact point P1 between a rolling element 30 and the inner raceway 12 of the inner ring 10, the first contact point P1 being positioned between the proximal end 1A of the rolling bearing 1 and the rolling plane Pr. Also defined is a second contact point P2 between a rolling element 30 and the inner raceway 12 of the inner ring 10, the second contact point P2 being positioned between the distal end 1B of the rolling bearing 1 and the rolling plane Pr. In operation, the first contact point P1 can be eliminated, particularly due to the load applied.

The inner ring 10 is typically made in two parts in order to facilitate the assembly of the rolling bearing 1. The inner ring 10 is thus typically composed of a proximal segment and of a distal segment, the junction of which is at the rolling plane Pr. A configuration of this type, in two parts, also allows facilitating the internal lubrication of the rolling bearing.

The outer ring 20 has an outer raceway 22 in contact with which are disposed the rolling elements 30. The outer raceway 22 generally has the shape of a circular arc, and defines a single contact point with each rolling element 30. Thus a third contact point P3 is defined between each rolling element 30 and the outer raceway 22 of the outer ring 20, the third contact point P3 being positioned between the proximal end 1A of the rolling bearing 1 and the rolling plane Pr. The third contact point P3 is typically disjoint from the rolling plane Pr.

In operation, the rolling bearing 1 has two or three contact points, depending on the load applied. In the case of a solely axial load, or of a dominant axial load along the main axis Z-Z, the rolling bearing 1 operates typically with two contact points, namely the contact points P2 and P3; the contact point P1 is then eliminated, i.e. inoperative in this operating condition of the rolling bearing. FIGS. 3A and 3B schematizes such an operating mode.

In the case of an axial and radial load with a dominant radial, or solely radial load, the rolling bearing 1 operates with three contact points P1, P2 and P3. Though it is noted that certain operating points are accomplished with two contact points, a rolling element of this type is commonly designated as a three-point contact rolling bearing.

Moreover it is noted that depending on the force exerted, the contact point P3 tends to move toward the rolling plane Pr, for example under the influence of a radial force to which every rolling element 30 is subjected due to its rotation around the main axis Z-Z. The contact point P3 will however not move beyond the rolling plane Pr except in the case of a reversal of the direction of application of the axial force.

It is thus understood that a portion of the outer raceway 22 has no contact point with the rolling elements 30. More precisely, the portion of the outer raceway 22 disposed between the rolling plane and the distal end 1B is not loaded by contact with the rolling elements 30 under normal conditions of use of the rolling bearing 1, i.e. within the scope of use as a thrust bearing subjected mainly to an axial load in a given direction. The present disclosure thus proposes using this portion of the outer raceway 22 to accomplish a drain function.

The outer ring 20 thus comprises a drain 50 provided in the outer raceway 22 and opening from an outer surface of the outer ring 20 so as to allow a circulation of fluid. The drain 50 thus has a first orifice 51 opening on the outer raceway 22, and a second orifice 52 opening from an outer surface of the outer ring 20.

The first orifice 51 of the drain 50 opens on the outer raceway 22 at a point that is offset with respect to the rolling plane Pr, so that, the third contact point P3 being located in a sector of the outer raceway 22 delimited by a proximal end of the outer raceway 22 on the one hand, and by the rolling plane Pr on the other hand, the first orifice 51, for its part, is eccentric with respect to the rolling plane Pr, disjoint from the third contact point P3. The first orifice 51 is therefore located in a sector of the outer raceway 22 delimited by the rolling plane Pr on the one hand, and a distal end of the outer raceway 22 on the other hand. The first orifice 51 of the drain 50 is thus positioned so that under normal operating conditions of the rolling bearing 1, the rolling elements 30 do not come into contact with the first orifice 51. As detailed hereafter, the implementation of the outer raceway 22 in the form of an ogive with an axis that is inclined with respect to the rolling plane Pr allows ensuring that the rolling element 30 do not come into contact with the first orifice 51 when it is located at the peak of the ogive, including the case of operation with reversal of the thrust exerted on the rotating shaft which carries the inner ring of the rolling bearing.

The second orifice 52 of the drain 50 opens for example on an axial end of the outer ring 20. Designated by axial end is a surface forming an end of the outer ring 20 in the direction defined by the main axis Z-Z; typically a surface extending radially with respect to the main axis Z-Z. In the example illustrated, the second opening 52 opens from a distal end 20B of the outer ring 20.

The drain 50 has a duct body extending between the first orifice 51 and the second orifice 52, typically in a direction having an axial component along the main axis Z-Z, and a radial component with respect to the main axis Z-Z. As a variant, the drain 50 can extend in the axial direction, i.e. parallel to the main axis Z-Z.

The duct body can also have a circumferential component, so that it can have a rectilinear shape or even the general shape of a circular arc or of an elliptical segment. What is designated here as a circumferential component is a component in a direction perpendicular to the plane defined by the main axis Z-Z and by the radial direction for a given point. The outer ring 20 can be implemented by additive manufacturing, the more so if the duct body has a curved shape which would not be producible by drilling.

The dimensioning and the geometry of the duct body can in particular be defined depending on the normal operating conditions expected for the rolling bearing 1. In operation, the fluid is centrifuged, and therefore leaves the drain by the second orifice 52. The system comprising the rolling bearing 2 is then typically provided with means allowing collecting the fluid, cooling it if necessary, filtering it and returning it to a storage area before its possible re-injection into the bearing 1.

The outer ring 20 typically has a plurality of disjoint and distinct drains 50 distributed around the main axis Z-Z, for example all around the main axis Z-Z. In the example illustrated in FIGS. 1 and 2, the rolling bearing has 5 drains 50 distributed regularly around the main axis Z-Z. It is understood that the number of drains is not limiting; the rolling bearing 1 can have any number of drains 50 formed on the outer ring 20.

As a variant, the outer raceway 22 has the shape of an ogive that is asymmetric with respect to the rolling plane Pr, i.e. with two portions forming for example a truncated cone that is asymmetric with respect to the rolling plane Pr, or two circular arcs that are asymmetric with respect to the rolling plane Pr.

FIGS. 4 and 5 illustrate this embodiment schematically. Represented schematically in FIG. 4 is a detailed view of the inner ring 10, the outer ring 20 and a rolling element 30. FIG. 5 illustrates the geometry of the outer raceway 22. In this embodiment, the outer raceway 22 has an ogive shape formed from two circular arcs C1 and C2 with respective radii R1 and R2 which can be equal or distinct, and having two distinct centers, respectively P1 and P2. Shown in FIG. 5 is the extension of the circular arcs C1 and C2 in dotted lines, which highlights the ogive shape thus obtained. The two circular arcs intersect at the peak S of the ogive, through passes an axis symbolized here by a broken line and forming an axis of symmetry between the two centers P1 and P2 if the two radii R1 and R2 are equal. Generally, whether the radii R1 and R2 are equal to distinct, the axis of the ogive forms an axis of symmetry for a crosspiece formed by two tangents to the arcs C1 and C2 at the peak of the ogive. An inclined ogive is considered due to the fact that its axis is inclined with respect to the rolling plane Pr.

The ogive is inclined in such a manner that its peak S is offset with respect to the rolling plane Pr. The drain 50 typically opens at the peak S of the ogive; in the example illustrated, the first orifice 51 of the drain is centered on the peak S. In nominal operation, here with a thrust (axial load) along the main axis Z-Z in a direction which produces on the inner ring 10 an axial force directed from the distal end 1B toward the proximal end 1A, the rolling elements 30 come into contact with the portion of the outer raceway 22 defined by the first circular arc C1. Moreover, in operation with in addition a strong centrifugal effect on the rolling elements 30, typically when the speed factor is high, the contact area of the rolling elements 30 on the outer raceway 22 approaches the rolling plane and therefore the peak S of the ogive. The ogive is designed sufficiently inclined so that this contact zone does not impinge on the orifice 51 of each drain.

An embodiment of this type also has the advantage of ensuring that in the case of a thrust reversal, the rolling elements 30 do not come into contact with an orifice 51 of the drain 50. In fact, in an inclined ogive configuration forming the inner raceway 22, the rolling elements 30 cannot come into contact with the first orifice 51 centered on the peak S of the ogive. In the case of a thrust reversal, the rolling elements would come into contact here with the portion of the outer raceway 22 defined by the second circular arc C2.

Thus, by positioning the drain at the peak S of the ogive in this manner, it is ensured that the rolling elements 30 do not come into contact with the drain, which in the case of using the rolling bearing in a device likely to undergo a thrust reversal allows employing rolling elements 30 made of steel and not of ceramic. In fact, if the outer raceway 22 was for example purely circular, and if conventional rolling elements 30 made of steel were used and could come into contact with the edge of an opening 51 of a drain 50 in particular during a thrust reversal, these rolling elements 30 made of steel would be degraded, which would then require employing rolling elements 30 of a substantially harder material, such as ceramic. Moreover, unlike known structures, the peak S of the ogive is offset here with respect to the rolling plane Pr. This structure thus also allows avoiding operation with four contact points in the event of a high radial load, and therefore avoiding a dissipation of power resulting from two contact points between the rolling elements 30 and the outer ring 20.

The presence of drains 50 allows ensuring a circulation of fluid, thus ensuring the lubrication and cooling of the rolling bearing 1. The configuration shown, in which the drain 50 has a second orifice 52 opening axially also allow accomplishing these functions for a rolling bearing 1 having a film of oil or "squeeze film," i.e. a film of oil under pressure positioned between the outer ring 20 and a part of the structure. In fact, this oil film commonly surrounds an outer radial wall of the outer ring 20. The fact that the drain 50 opens on an axial end of the outer ring 20, and not on a radial end of the outer ring, allows separating the fluid with respect to the oil film, and therefore accomplishing these two functions on the rolling bearing 1.

FIGS. 6 and 7 show another embodiment of a rolling bearing 1 according to one aspect of the invention.

Found in this embodiment are the different elements of the rolling bearing 1 as already presented with reference to FIGS. 1 and 2.

In this embodiment, the drain 50 is continuous over the entire periphery of the outer ring 20.

A drain is thus implemented by reducing the thickness of material of the outer ring 20 for the portion of the ring located between the rolling plane Pr and the distal end 20B of the outer ring 20.

More precisely, the rolling raceway 22 of the outer ring 20 defines two shoulders on either side of the rolling plane Pr: a proximal shoulder and a distal shoulder.

The proximal shoulder has an inner diameter D1, and the third contact point P3 is located on the side of this proximal shoulder. The inner diameter D1 is typically constant. The dimension of the inner diameter D1 is defined in particular depending on the axial load to which the rolling bearing 1 will be subjected under expected conditions in normal operation.

The distal shoulder has an inner diameter D2 that is strictly greater than the inner diameter D1 of the proximal shoulder, and therefore the distal shoulder has a smaller thickness than the proximal shoulder. In fact, due to the fact of the absence of the contact point between the rolling elements 30 and the outer ring 20 in this area under expected nominal operating conditions of the rolling bearing 1, this region of the outer ring 20 is not loaded and is not subjected to high loads. This smaller thickness of the distal shoulder allows achieving a circulation of fluid and thus forming a continuous drain 50 over the entire radial periphery of the outer ring 20. As before, the drain thus formed opens on an axial end of the outer ring 20, at the inner radial end of a face of the outer ring 20 extending radially. This embodiment is therefore also compatible with the use of a film of oil under pressure around the rolling bearing 1.

In the example illustrated, the inner diameter of the outer ring 20 increases from the distal shoulder to the distal end 20B of the outer ring 20, which thus forms a chamfer from the rolling raceway 22 of the outer ring 20 to the distal end 20B of the outer ring 20. This optional embodiment allows in particular improving the circulation of the fluid and facilitating its removal.

The distal end typically has a non-zero thickness, the thickness corresponding here to the difference between the inner radius of the rolling raceway 22 at the rolling plane Pr, and the radius at the distal end of the rolling raceway 22. Thus retaining a non-zero thickness of the distal shoulder allows accomplishing a function of taking up intermittent loads under particular operating conditions, particularly in the case of a reversal of the direction of the axial load along the main axis Z-Z with respect to the direction in nominal operation, and to then avoid disassembly of the elements of the rolling bearing 1.

The embodiments shown in FIGS. 1 to 7 are not limiting and can be combined. By way of an example, it is possible to add drillings to as to form disjoint drains 50 as can be seen in FIGS. 1 and 2 in a manner similar to the embodiment shown in FIGS. 3A, 3B, and 4. It is also possible to vary the thickness of the outer ring 20 in the embodiment shown with reference to FIGS. 1 and 2. FIGS. 8 and 9 illustrate an embodiment of this type, in which the distal shoulder has a smaller thickness than the proximal shoulder, and in which a plurality of disjoint drains 50 are formed in the outer ring 20. The other elements are similar to the elements already described with reference to the preceding figures.

The rolling bearings as presented can thus allow dispensing with the necessity of integrating a specific air or oil cooling system in a turbine engine, and can allow minimizing the thermal balance and optimizing the cooling system.

The rolling bearings as presented are particularly adapted for applications in which a single or main direction of rotation is provided for, which is the case in particular in the field of aeronautics for turbojets and turbine engines, and also for driving helicopter and aircraft rotors, particularly by electrical machines.

Although the present invention has been described by referring to specific embodiments, it is obvious that modifications and changes can be carried out on these examples without departing from the general scope of the invention as defined by the claims. In particular, individual features of the different embodiments illustrated/mentioned can be combined into additional embodiments. Consequently, the description and the drawings must be considered in an illustrative, rather than a restrictive sense.

It is also obvious that all the features described with reference to a method are transposable, alone or in combination, to a device, and conversely all the features described with reference to a device are transposable, alone or in combination, to a method.

The invention claimed is:

1. A three-point contact rolling bearing comprising:
   an inner ring;
   an outer ring, wherein the inner ring and the outer ring define respectively an inner raceway and an outer raceway, between which are disposed a plurality of spherical rolling elements, so as to define a rotation movement along a main axis between the inner ring and the outer ring, said rolling elements being centered on a rolling plane perpendicular to the main axis,
   wherein the inner raceway defines a first contact point and a second distinct contact point between each rolling element and the inner ring, the outer raceway defines a third contact point between each rolling element and the outer ring, wherein said third contact point being located in a sector of the outer raceway delimited by a proximal end of the outer raceway and by the rolling plane, wherein the outer ring comprises a drain provided in the outer raceway and comprising an outer surface drain orifice opening from an outer surface of the outer ring, and an outer raceway drain orifice opening eccentrically on the outer raceway with respect to the rolling plane, in a sector of the outer raceway delimited by the rolling plane and a distal end of the outer raceway, the drain and the third contact point being disjointed, wherein the outer surface of the outer ring from which the drain opens extends radially with respect to the main axis, wherein the outer ring has a proximal end and a distal end defined in a direction along the main axis, the third contact point being in an area delimited axially by the proximal end of the outer ring and by the rolling plane, and wherein the outer ring forms a proximal shoulder on one axial side of the rolling plane, and a distal shoulder on an other axial side of the rolling plane, said shoulders having distinct dimensions in a radial direction with respect to the main axis, wherein the outer raceway has a shape of a circular arc, so as to define a single contact point with each rolling element, wherein an inner diameter of the distal shoulder of the outer raceway is greater than an inner diameter of the proximal shoulder of the outer raceway.

2. The rolling bearing according to claim 1, wherein the drain extends in a direction having a non-zero radial component and a non-zero axial component with respect to the main axis.

3. The rolling bearing according to claim 1, wherein the drain extends in a direction parallel to the main axis.

4. The rolling bearing according to claim 1, wherein the drain extends in a direction having a non-zero radial component, a non-zero axial component with respect to the main axis and a non-zero circumferential component.

5. The rolling bearing according to claim 1, wherein the proximal shoulder has a greater thickness than the distal shoulder, the thickness being measured in a radial direction with respect to the main axis.

6. The rolling bearing according to claim 1, wherein the outer ring comprises a plurality of disjointed drains distributed around the main axis.

7. The rolling bearing according to claim 1, wherein the drain is formed by a continuous bore extending from the outer raceway until the distal end of the outer ring.

8. A turbine engine comprising at least one rolling bearing according to claim 1.

9. An aircraft comprising the turbine engine according to claim 8.

* * * * *